3,787,489
FLUORINATION PROCESS
Albert Antonini and Robert Putters, Paris, and Georges Wetroff, Le Thillay, France, assignors to Societe Rhone-Progil, Courbevoie, France
No Drawing. Filed May 1, 1972, Ser. No. 249,195
Claims priority, application France, May 6, 1971, 7116334
Int. Cl. C07c 53/18
U.S. Cl. 260—544 F         11 Claims

ABSTRACT OF THE DISCLOSURE

A process for the perfluorination of perchloro compounds containing a trichloromethyl and/or pentachloroethyl group by reaction with anhydrous HF in the vapor phase in the presence of a fixed bed catalyst, wherein the perchloro compound and HF are passed through a first reaction zone at an elevated temperature to convert the perchloro compound to at least the corresponding difluoro derivative, the reaction gases are passed to a a second zone to produce a reaction mixture in which the intermediate chlorofluoro compounds contain an average ratio of F atoms to Cl atoms of at least 1.5, and the reaction mixture is passed to a third zone maintained at a higher temperature, with the pressure in each zone being within the range of 1–4 bars and the termperature in each zone being at least 10° C. higher than that in the preceding zone.

---

The present invention relates to an improved method for the vapor phase perfluorination of functional perchloro compounds including in their molecule trichloromethyl (—$CCl_3$) or pentachloroethyl (—$C_2Cl_5$) groups whereby, with one single pass of the reagents, the desired perfluoro compound is obtained at high output and productivity.

The expression "functional perchloro compound" as used herein shall mean compounds whose molecules contain (a) at least one functional group such as ether-oxide, aldehyde, ketone, acid chloride, nitrile functional groups;
(b) no hydrogen atom which can be substituted by a chlorine atom.

It is known to effect the catalytic fluorination of functional halogenated compounds such as trichloroacetyl chloride or hexachloroacetone by treating these compounds with hydrofluoric acid in the presence of a catalyst in either liquid or vapor phase.

When operating in the liquid phase, for example, in the presence of antimony halides as catalysts, the fluorination of the functional perchloro compounds is incomplete and does not result in the corresponding perfluoro compounds.

In order to obtain the perfluoro compounds from functional perchloro compounds, all the chlorine atoms of the initial molecule must be replaced successively by fluorine atoms, which implies carrying out as many successive fluorination phases as there exist chlorine atoms in the initial molecule, for example, four successive steps in the case of trichloroacetyl chloride, six successive steps in the case of hexachloro acetone, etc.

Complete fluorination can be achieved by carrying out the fluorination of the functional perchloric compounds by means of hydrofluoric acid in the vapor phase and in the presence of a catalyst, preferably on a chromium base. The methods describing this operation indicate that a reaction temperature must be used which ranges from a lower limit of 200° C. to an upper limit of 600° C. and the embodiments specify that the reaction temperature is located practically between 250° C. and 380° C.

Under these conditions it is actually possible to carry out the successive fluorination phases of the functional perchloro compound in question. However, in practice two types of difficulties are encountered.

For example, if the fluorination of hexachloroacetone is carried out under relatively mild conditions, characterized by a temperature of 250° C., a hexachloroacetone feed of 66.4 grams per hour and per kilogram of catalyst, and an HF feed of 65.5 grams per hour and per kilogram of catalyst, in the presence of a good catalyst, the final fluorination phases are incomplete and do not relate to the total of the molecules of the initial reagent. Then a mixture of different chloro-fluorinated compounds is collected in which the perfluoro compound exists only in a low proportion. When it is desired to manufacture only this perfluoro compound, the compounds containing chlorine atoms present in the mixture obtained represent undesirable by-products and the productivity in the desired perfluoro compound is notably reduced. Thus, in the case cited above as example, the productivity in hexafluoroacetone is only 29.7 grams per hour and kilogram of catalyst, which is extremely low.

Moreover, the mixture of organic compounds obtained contains:

| | Mole percent |
|---|---|
| Dichlorotetrafluoroacetone | 38 |
| Monochloropentafluoroacetone | 20 |
| Hexafluoroacetone | 4 |

The complement is constituted essentially by:

| | |
|---|---|
| Trichlorotrifluoroacetone | 29 |
| Tetrachlorodifluoroacetone | 8 |
| Various $C_2$ compounds | 1 |

This shows that the productivity in desired perfluoro compound is extremely low: 1.65 grams per hour and per kilogram of catalyst.

Evidently, the result of the operation can be improved by separating the chloro-fluoro by-products present in the mixture obtained and subjecting them to a new fluorination operation in the vapor phase; by alternating the complementary separations and fluorinations of compounds still containing chlorine atoms, it is possible to increase the yield in the desired perfluoro product. However, the productivity of this method remains extremely low and this method is also complicated and costly. Naturally, it is simpler and more economical to be able to have a method available which leads directly to the desired perfluoro compound in one single pass of the reagents with a high yield and a high productivity.

If, on the other hand, fluorination is carried out at a high temperature (300 to 350° C.) in order to increase the productivity of the desired perfluoro compound, outputs are obtained which are limited due to the buildup in a considerable proportion (more than 10 mole percent) of parasitic reactions leading to the formation of unusable byproducts, due to decarbonylation of the ketone products. This second type of difficulty results in the loss of part of the organic reagents and in the formation of compounds other than the desired perfluoro compound which cannot be converted to the desired perfluoro compound.

Moreover, the productivity of the method remains relatively low because by opertaing at 300 to 350° C., with a feed of HF of 310 grams per hour and per kilogram of catalyst and a feed of hexachloroacetone of 210 grams per hour and per kilogram of catalyst, the average rate of conversion per pass of reagents is 45%, and the product contains 89.4% hexafluoro acetone, that is a production of hexafluoro acetone of 53 grams per hour and per kilogram of catalyst. When it is desired to actually increase the productivity of the reaction by elevating the temperature still more, it is observed that the results become very bad, because the yield in hexafluoroacetone drops to 20% due to the heat cleavage of the molecules at a temperature of 380 to 450° C., with a yield of hexachloroacetone of 517 grams per hour and per kilogram of catalyst. The productivity in hexafluoroacetone remains low and the loss of product by decomposition is prohibitive.

Analogous observations can be made as far as the fluorination of trichloroacetyl chloride is concerned; at a temperature between 250 and 325° C., only 62.5 mole percent of a mixture of trifluoroacetyl fluoride and monochlorodifluoroacetyl fluoride, rich particularly in this latter compound which is not the desired perfluoro compound, are obtained.

Consequently, in practice, the state of the art shows that it is difficult to obtain at the same time a complete perfluorination of the perchloro compounds in one pass of the reagents in the fluorination zone in the vapor phase, a suitable productivity and a very low loss of useful material, due to the parasitic reactions of decomposition to form non-usable compounds.

It is accordingly an object of the present invention to provide a method for the preparation of perfluoro functional compounds which overcomes the foregoing disadvantages.

It is a more specific object of the invention to provide a method for the preparation of perfluoro functional compounds in which perfluorination is achieved in a single pass of the reactants over the catalyst without the need to recycle byproducts of the fluorination reaction.

It is a related object of the invention to provide a method for the preparation of perfluoro compounds by reaction of a perhalogenated functional compound with HF in which the total fluorination rate based on HF, defined by the ratio of the number of moles of HF which have been reacted to the number of moles of HF theoretically necessary for complete perfluorination of the organic reactant is at least 95%, and preferably at least 98%.

It is a further object of the invention to provide a method for the preparation of perfluoro compounds by reaction of a perhalo functional compound with HF wherein the organic effluent contains at least 95%, and preferably at least 97%, of the desired perfluoro compound, and wherein the destruction of the organic feed by parasitic side reactions is less than 5 mole percent, and generally less than 3 mole percent.

It is yet another object of the invention to provide a method for the preparation of perfluoro compounds in which the desired perfluorination compound is obtained in one pass through the fluorination zone, with a productivity greater than 100 grams per hour per kilogram of catalyst.

These different objectives as well as other advantages which will appear in the descriptions of the method are achieved according to the method of the present invention by the fact that the perfluorination of a perchloro compound employs a series of successive reactions of the following type:

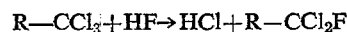
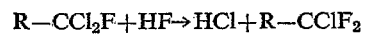

wherein R represents a radical which is the bearer of the functional group, with each of these reactions forming a fluorination phase. During the reaction, the reaction mixture consequently contains a mixture of perchlorofluoro intermediate compounds which can be characterized by the average ratio

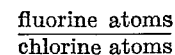

per organic molecule in the mixture.

According to the invention, anhydrous hydrofluoric acid is caused to react continuously in the vapor phase with a functional perchloro compound containing in its molecule perchloromethyl ($-CCl_3$) or perchloroethyl

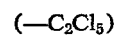

radicals such as, for example, trichloroacetyl chloride, hexachloro acetone, octachloro butanone, trichloro acetaldehyde, pentachloropropionyl chloride, at a temperature within the range from 220 to 350° C. in the presence of a fluorination catalyst. The method of this invention is characterized by the fact that (a) The reagents are passed at an absolute pressure of 1 to 4 bars, preferably from 1.2 to 2.5 bars, through a fixed bed of the catalyst comprising three successive zones adjusted to temperatures increasing from the first to the third zones and differing by at least 10° C. from one zone to the next;

(b) The first two fluorination phases are carried out entirely in the first zone, at a temperature set between 220 and 250° C.;

(c) In the second zone, the fluorination is continued at a temperature between 250 and 275° C. and the intermediate perfluorochloro compounds in the effluent of this zone produce an average ratio in the molecule of the number of fluorine atoms to the number of chlorine atoms equal to or higher than 1.5;

(d) In the third zone the total perfluorination of the organic compounds present is carried out at a temperature fixed between 275 and 350° C.

It is important and characteristic of the method that at least the first two stages of the perfluorination are carried out in their entirety in the first above described reaction zone, at a temperature ranging within the specified range. This means that the effluent from the first zone no longer contains any initial perchloro compound nor any monofluoro compound originating from the initial compound.

It is also an important characteristic for the invention that the intermediate compounds present at the discharge from the second zone, which operates in a well defined temperature range, contain on the average in their molecule a ratio of the number of F atoms to the number of Cl atoms equal to or higher than 1.5.

When these criteria are met, it has been found that the last fluorination zone, according to the method of the invention, may be elevated to a relatively high temperature, up to 350° C., in order to complete the perfluorination to the maximum, without excessive decomposition of the molecules present.

The selection of the temperatures in the ranges specified for each of the three successive zones of reaction is not arbitrary. It depends on the nature of the functional perchloro compound in question. It also depends on the other reaction conditions, such as the contact time in each one of the reaction zones, the pressure, the mole ratio of anhydrous hydrofluoric acid to the functional perchloro compound used in the operation and the activity of the catalyst. This selection of the temperatures of each zone is essential in order to obtain the high productivity which is one of the goals of the invention.

It has been found that the temperature fixed for the second zone is most crucial because the molecules present in this zone are sensitive to decomposition and present, in addition, a clearly lower fluorination rate than the molecules passed into the first zone. The selection of this temperature should be adjusted suitably and constitutes a balance between a relatively low temperature, such as 250° C., to avoid thermal decomposition, and a higher temperature, such as 275° C., to allow an increase in the rate of fluorination. The examples given below show how this balance can be reached in these cases.

In the first zone, the relatively high fluorination rate of the compounds used in the method makes it possible to limit the reaction temperature to between 220 and 250° C. On the other hand, in zone three, the total perfluorination in one pass of the reagents over the catalyst requires a much higher temperature which varies considerably, depending on the nature of the desired perfluoro compound. However, in this latter zone, the danger of heat decomposition of the molecules present is very low and the temperatures can be fixed above 275° C. and up to 350° C., without the final yield in the desired perfluoro compound being limited substantially by parasitic reactions.

When the temperature of the three successive zones is adjusted, the contact time of the reagents in each of the zones can be best set for values ranging from 2 to 10 seconds for each zone, said contact time being determined for the gaseous reagents under the operating conditions of temperature and pressure and in relation to the total volume of each zone, disregarding the volume occupied by the catalyst. Maximum productivity is obtained by an adjustment of the temperature of each zone carried out in order to assure a rate of consumption of hydrofluoric acid which is substantially of the same order in each zone; this causes the contact time of the reagents in each of the three zones to be a function of the quantity of hydrofluoric acid to be reacted therewith.

In practice, this condition is realized in a very simple manner. For example, if the reactor is of constant cross-section over its entire length, the length of each zone is adjusted in such a manner that each one substantially corresponds to the quantity of hydrofluoric acid which is to react in it. Indeed, the reaction is practically carried out without variation in the number of molecules, because the parasitic reactions of decomposition are reduced to a minimum and the fluorination is carried out with a constant number of molecules. Thus, by applying determined lengths to each of the reaction zones, the corresponding contact times are approximately proportional to the quantity of hydrofluoric acid which is to react in each zone. Moreover, for a given feed in each zone, the actual contact times also vary as a function of the temperature prevailing in each zone, particularly when the extreme temperatures are clearly different.

However, such a method is not crucial in the present procedure. On the contrary, the contact time in one of the three zones, particularly in the third one, can be increased in order to obtain better yields of the desired perfluoro product.

In order to better explain how to determine the contact time in each zone for the purpose of maximum productivity, consider the example of fluorination of hexachloro acetone.

In the first zone, at a temperature of 236° C., the partial fluorination of hexachloro acetone is carried out until a mixture of perchlorofluoro compounds is obtained which contains on the average 2.6 fluorine atoms per organic molecule. The sum total of the first two phases thus is carried out and the mixture of intermediate compounds leaving the first zone has an average composition which substantially corresponds to the formula $C_3OCl_{3.4}F_{2.6}$.

In the second zone, the fluorination of the organic molecules is carried out at 265° C. until there is obtained a mixture of perchlorofluoro compounds containing an average of 4.4 fluorine atoms per organic molecule which corresponds to a mixture of intermediate compounds of a formula equivalent to $C_3OCl_{1.6}F_{4.4}$ whose ratio of fluorine atoms to chlorine atoms is equal to 2.75, that is above 1.5. Thus, 1.6 HF molecules per organic molecule remain for reaction to achieve the total perfluorination which is accomplished in a third zone at 310° C. The contact time in the three successive zones are, respectively, 6 seconds, 4.1 seconds and 3.5 seconds, which makes it possible to calculate, considering the temperatures and the total yield, the dimension of each zone. The average reaction rates in the three zones are equal to about 0.38 HF mole per second and per hexachloro acetone molecule.

It is evident that the fixing of the temperatures and of the contact times in the three zones are parameters which require determination in each case.

In the present invention it is imperative for the first two stages of fluorination to be carried out entirely in the first zone. Consequently, the number of hydrofluoric acid moles which must react in the other two zones is lower than $n-2$, $n$ being the number of HF moles corresponding to the perfluorination of the initial compound considered, for example equal to 4 for trichloroacetyl chloride, 6 in the case of pentachloropropionyl chloride and hexachloro acetone, and 8 in the case of perchloro butanone. These differences relative to the initial compound considered require a determination of the operating conditions in each case. Thus, the lower limit of the ratio of number of fluorine atoms/number of chlorine atoms which must be reached, according to the invention, at the discharge from the second zone, is preferably fixed as being equal to or higher than 3 in the case of trichloroacetyl chloride and trichloroacetaldehyde and 2 in the case of hexachloro acetone. In the case of octachloro butanone, this limit is at least equal to 1.5 and joins the characteristic value defining the invention.

The productivity of the method is influenced by the pressure of the reagents in the three reaction zones. The reaction speed increases substantially with the absolute pressure within the limit of 1 to 2.5 bars and increases still slightly in the range of 2.5 to 4 bars when a good catalyst is used. However, above 4 bars the gain in productivity is very limited or zero while the technological difficulties become greater so that, although under conditions that make it possible to carry out the reaction at an absolute pressure higher than 4 bars, for example in the case of trichloroacetyl chloride whose volatility is sufficient, it is neither advantageous nor economical to exceed this value. The use of an absolute pressure above 1 bar is particularly advantageous due to the fact that the parasitic reactions of decomposition are very limited while the fluorination rate increases substantially with the pressure up to 2.5 bars. Thus, the pressure improves the productivity of the method and increases at the same time the output in the desired product. Moreover, in certain cases it is useful for the effluent from the fluorination reactor to be under pressure, which facilitates the separation of the products of the reaction. Consequently, it is preferable to carry out the method according to the invention by using an absolute pressure from 1.2 to 2.5 bars.

The productivity of the method is also a function of the feed ratio of the reagents, anhydrous hydrofluoric acid and functional perchloro compound. It is necessary to use at least a quantity of anhydrous hydrofluoric acid permitting total perfluorination of the perchloro compound. Thus, the mole ratio of feed HF/perchloro compound must be equal to or higher than the number $n$ previously defined, that is, 4 in the case of trichloroacetyl chloride, 6 in the case of pentachloropropionyl chloride and hexachloro acetone, and 8 in the case of octachloro butanone. Excess HF in relation to stoichiometry is useful, as it very substantially increases the fluorination rate, particularly as far as the final phases are concerned, leading to the total perfluorination of the organic feed. It is preferable to carry out the method according to the invention by using an excess HF of at least 20 mole percent in relation to stoichiometry.

On the other hand, too high an HF excess is undesirable as the gain over the fluorination rate is offset by a loss of productivity due to the large dilution of the organic compounds in the reaction volume. Consequently, it is preferable to carry out the method according to the invention by using an excess of HF between 20 and 80 mole percent in relation to the stoichiometry of the perfluorination reaction.

Having described the basic concepts of the invention, reference is now made to the following examples, which are provided by way of illustration, and not by way of limitation, of the practice of the invention.

EXAMPLE 1

A reactor formed of an externally heated stainless steel tube with an inner diameter of 35.6 mm. and a length of 1,500 mm. is heated by three independent electric heating elements. An axial couple under a casing is provided to determine the thermal profile of the reactor. The reactor has 12 lateral outlets spaced at 80 mm., the first one being located at 300 mm. from the entrance of the reactor. These lateral outlets normally are closed but can be opened to analyze the composition of the reaction mixture at different points along the reactor.

The fluorination catalyst is prepared by treatment of a precipitated chromium hydroxide gel with anhydrous HF at increasing temperatures. After fluorination and agglomeration in granules of about 5 mm., the specific surface of this catalyst is 186 m.$^2$/gram.

The reactor is maintained vertical. It is loaded so as to obtain from the bottom upward:

a layer of tabular alumina balls (corundum not attackable by HF), 70 mm. high;
a catalyst layer 335 mm. high (third catalytic zone);
a layer of tabular alumina 70 mm. high;
a catalyst layer 365 mm. high (second catalytic zone);
a layer of tabular alumina 70 mm. high;
a catalyst layer 500 mm. high (first catalytic zone);
a layer of tabular alumina 60 mm. high.

Altogether 1.2 liters of catalyst weighing 0.84 kilograms are loaded.

The reagents, 99.7% anhydrous hydrogen fluoride and 99.5% hexachloroacetone, are fed into the reactor from the top and successively contact:

a layer of tabular alumina 60 mm. high which allows for the mixing and preheating of the reagents;
three layers of catalyst separated by two layers of alumina.

Each of the catalyst layers is heated by one of the external heating elements so that the temperature is substantially uniform therein. The elevation of temperature of the gases is produced in the intermediate layers of tabular alumina.

The feeds in reagents are adjusted to 0.94 mole per hour of hexachloroacetone and 8.4 moles per hour of anhydrous HF, that is an excess of anhydrous HF of 48.8% in relation to the stoichiometry.

The pressure in the reactor is fixed at 1.3 bars.

The temperatures of the three catalytic zones are set at 236, 265 and 310 C. The contact times in each of the three zones are 6 seconds, 4.1 seconds and 3.5 seconds, respectively.

At the outlet of the first catalytic zone the analysis of the reaction mixture shows that the number of fluorine atoms fixed, on an average, per organic molecule is equal to 2.6, and that the first two stages of the fluorination are carried out in their entirety in the first zone. At the outlet of the second zone the analysis shows that the number of fluorine atoms fixed, on the average, per organic molecule reaches 4.4 and that the average composition of the organic compounds corresponds to a ratio of fluorine atoms to chlorine atoms of 2.75. At the outlet of the third catalytic zone the composition of the effluent is as follows:

(a) Organic part

| | Mole percent |
|---|---|
| Hexafluoroacetone | 96.8 |
| Pentafluoromonochloroacetone | 1.2 |
| Tetrafluorodichloroacetone | 0.1 |
| Perchloroethylene | [1] Trace |
| Tetrachlorodichloroethane | 0.2 |
| Trifluorotrichloroethane | 1.2 |
| Difluorotetrachloroethane | 0.3 |
| Miscellaneous (principally $C_1$ compounds) | 0.2 |

(b) Inorganic part

| | Percent |
|---|---|
| HF | 33.7 |
| HCl | 66.3 |

[1] Below 0.01%.

The effluent also contains a small quantity of carbon monoxide originating from the destruction of the ketone molecules with formation of compound in $C_2$.

The total fluorination rate in relation to HF, that is, HF moles consumed/theoretic amount of moles of HF, is 98.7%.

The content of the organic effluent in the desired perfluoro product is 96.8%.

The rate of decomposition of the organic molecules by parasitic reactions is 1.9%.

The production of hexafluoroacetone is 0.91 mole/hour, or 151 grams/hour. The productivity is equal to 180 grams per hour and per kilogram of catalyst.

For comparison, several tests were conducted by adjusting the three catalytic zones to the same temperature or by adjusting two of the three catalytic zones to the same temperature, all other conditions being the same as those of Example 1.

TABLE

| Comparative test | a | b | c | d | e | f | Ex. 1 |
|---|---|---|---|---|---|---|---|
| Temperature of— | | | | | | | |
| Zone 1 in, ° C | 236 | 265 | 310 | 236 | 236 | 265 | 236 |
| Zone 2 in, ° C | 236 | 265 | 310 | 236 | 310 | 265 | 265 |
| Zone 3 in, ° C | 236 | 265 | 310 | 310 | 310 | 310 | 310 |
| Total rate of fluorination in relation to HF in, percent | 51.7 | 88.2 | 94.7 | 79.2 | 92.2 | 91.8 | 98.7 |
| Rate of decomposition of the organic molecules in, percent | 1.5 | 6.2 | 14.3 | 5.3 | 8.7 | 6.4 | 1.9 |
| Content of organic effluent in percent hexafluoroacetone | 1.5 | 52 | 85.3 | 27 | 76.4 | 70.9 | 96.8 |
| Productivity in grams/hour and per kilogram of catalyst | 3 | 96 | 157 | 50 | 141 | 130 | 180 |

This table of results allows for the appreciation of the advantages obtained by operating in accordance with the invention.

Test (a) shows that at a low temperature in the entire reactor the fluorination rate is low and the formation of perfluoro product is negligible.

At an average temperature throughout the reactor, in test (b), the input temperature to which the hexachloroacetone molecules are subjected causes a notable cracking which corresponds to a 6.2% loss of reagent. By comparison between tests (b) and (f) it is shown that the cracking increases little when the third catalytic zone is elevated to 310° C. which is explained by the fact that the already highly fluorinated molecules are not very sensitive to cracking.

At an elevated temperature in the entire reactor (experiment c), the productivity in hexafluoroacetone becomes significant but the cracking of the molecules, primarily in the first and in the second catalytic zones, attains a high value which corresponds to a loss of reagents of 14.3%. The organic effluent only contains 85.3% hexafluoroacetone, which is mixed essentially with chlorofluoro $C_2$ hydrocarbons. The separation of the hexafluoroacetone from this mixture and its purification then present technical problems resulting in increased production costs. Economically, one thus loses both on the output in perfluoro product and on the purification cost of this product.

Tests (d), (e) and (f) make it possible to measure the desirability of having, in the method, a second zone at an intermediate temperature between those of the first and third zone. The rate of decomposition of the molecules by cracking is high, and the productivity is lower than that obtained according to the invention. Moreover, the effluent from the reactor includes a mixture of perchlorofluoro ketones and chlorofluoro hydrocarbons in $C_2$ which presents separation problems.

Test (d) shows that the absence of the second zone at a temperature of 265° C. leads to the introduction into the third zone of a reaction mixture which is sensitive to cracking. In fact, in this experiment, at the exit of the second zone, the rate of fluorination of the organic molecules is near 3 and the average composition of the organic molecules corresponds to a ratio of fluorine atoms to chlorine atoms of approximately 1, that is lower than the lower limit of 1.5 defining the method and far below the preferential limit of 2 specified in the case of hexachloroacetone. It is then noted that the rate of decomposition significantly increases in the third zone at 310° C.; this rate of decomposition indeed passes from 1.3% at the exit of the second zone to 5.3% at the exit of the third zone. This test thus shows the desirability of the second zone according to the invention which permits at the same time an increase of the productivity of the method and a reduction of the rate of decomposition of the molecules by cracking.

For comparison, likewise with Example 1, a test was conducted in which the contact time was reduced voluntarily so that the first two phases will not be carried out entirely in this zone. The loading of the reactor was modified so as to obtain successively from the bottom upward:

a layer of alumina balls of tabular shaped crystals, 70 mm. high;
a layer of catalyst, 250 mm. high (third catalytic zone);
a layer of tabular alumina, 70 mm. high;
a layer of catalyst, 615 mm. high (second catalytic zone);
a layer of tabular alumina, 70 mm. high;
a layer of catalyst, 335 mm. high (first catalytic zone);
a layer of tabular alumina, 60 mm. high.

The same catalyst is loaded as in Example 1 (1.2 liters; 0.84 kilograms) and the test is conducted under the same feed conditions.

The outside heating elements are changed so as to obtain uniform temperatures in each of the three new catalytic zones and these zones are heated to the same respective temperatures as in Example 1.

The absolute pressure is maintained at 1.3 bars.

The contact times in the three zones are respectively:

| Zone— | Seconds |
|---|---|
| 1 | 3 |
| 2 | 7 |
| 3 | 3.5 |

At the exit of the first zone, there is obtained a mixture constituted substantially of perchlorofluoro compounds containing on the average only 1.8 atoms of fluorine per organic molecule. The composition of the reaction mixture includes, in the organic portion:

| | Moles percent |
|---|---|
| Unconverted hexachloroacetone | 0 |
| Monofluoropentachloroacetone | 28.5 |
| 1,1-difluorotetrachloroacetone | 63.1 |
| Trifluorotrichloroacetone | 7.0 |
| Chlorofluoro $C_2$ compounds | 0.9 |
| Hexachloroethane | 0.3 |

The mixture of perchlorofluoro compounds at the exit of zone 2 contains an average of 4.2 fluorine atoms per organic molecule and the average ratio of fluorine atoms/chlorine atoms per organic molecule reaches 2.15.

At the outlet from the reactor the composition of the organic portion of the effluent is as follows:

| | Moles percent |
|---|---|
| Hexafluoroacetone | 79.6 |
| Pentafluoromonochloroacetone | 13.4 |
| Tetrafluorodichloroacetone | 1.8 |
| Trifluorotrichloroacetone | 0.1 |
| Perchloroethylene | 0.1 |
| Tetrafluorodichloroethane | 0.4 |
| Trifluorotrichloroethane | 3.2 |
| Difluorotetrachloroethane | 0.9 |
| Monofluoropentachloroethane | 0.1 |
| Miscellaneous ($C_1$ compounds) | 0.4 |

The overall fluorination rate in relation to HF in moles of HF consumed divided by the theoretic amount of moles of HF is 94.6% against 98.7% in Example 1. The organic effluent contains the desired perfluoro product in an amount of 79.6% against 96.8% in Example 1. The rate of decomposition of the organic molecules by parasitic reactions is 5.1% against 1.9% in Example 1.

The production of hexafluoroacetone is 0.748 moles/hour or 124 grams/hour. The productivity is equal to 148 grams/hour and per kilogram of catalyst.

These results are all inferior to those of Example 1 and demonstrate that it is critical to achieve the first two steps of the fluorination in their entirety at a limited temperature in the first reaction zone.

The results are even worse when the contact time is reduced in the second catalytic zone in favor of the contact time in the third zone. In fact, at the exit of zone 2 a sufficient number of fluorine atoms fixed on the average per organic molecule is not attained and the cracking increases.

EXAMPLE 2

The perfluorination of trichloroacetyl chloride is carried out in the same equipment and with the same catalyst as in Example 1 (1.2 liters; 0.84 kilograms), by arranging three layers of catalyst separated by layers of tabular alumina balls, the length of each catalytic zone being:

| Zone— | Mm. |
|---|---|
| 1 | 480 |
| 2 | 350 |
| 3 | 370 |

External heating elements are arranged for controlling the temperatures of the three zones respectively at 240, 260 and 300° C.

The reactor is fed a mixture of trichloroacetyl chloride (99% pure) and anhydrous hydrogen fluoride (99.7 pure) in the following amounts:

| | Moles/hour |
|---|---|
| Trichloroacetyl chloride | 0.97 |
| Anhydrous HF | 6.8 |

The amount of anhydrous HF used is 75% in excess of stoichiometric requirements. The absolute pressure in the reactor is adjusted to 1.3 bars. The contact time of the reagents in the three successive zones are 6.9 seconds, 4.8 seconds and 4.8 seconds, respectively.

At the exit of the first catalytic zone is a reaction mixture in which the number of fluorine atoms fixed on the average per organic molecule is 2.5.

In the reaction mixture at the exit of the second catalytic zone, the number of fluorine atoms fixed on the average per organic molecule is equal to 3.3 and the average ratio of fluorine atoms/chlorine atoms per organic molecule is equal to 4.7.

At the outlet from the third catalytic zone the composition of the organic portion of the effluent is as follows:

| | Percent |
|---|---|
| Trifluoro acetylfluoride | 97.1 |
| Difluoromonochloroacetylfluoride | 0.07 |
| Fluoro $C_1$ compounds | 2.83 |

The overall fluorination rate in relation to HF as HF moles consumed divided by theoretic HF moles is 97.2%.

The content of the organic effluent is desired perfluoro product is 97.1%.

The rate of decomposition of the organic molecules in relation to parasitic reactions is 2.83%.

The production of trifluoroacetyl fluoride is 0.94 moles per hour or 109 grams per hour. The productivity is equal to 130 grams per hour and per kilogram of catalyst.

Comparatively, by operating under the same conditions as above, but at a temperature of 300° C. in the entire reaction, the cracking leading to carbon monoxide and chlorofluoro $C_1$ molecules reaches 12.3%.

By operating again under the same conditions as above but at a temperature of 260° C. in the entirety of the reactor, the organic effluent contains 61% trifluoroacetyl fluoride, and the productivity drops to 81.5 grams per hour and per kilogram of catalyst.

EXAMPLE 3

The perfluorination of octachloro butanone is carried out in the same equipment and on the same catalyst as in Example 1 (1.2 liters; 0.84 kilograms) by arranging three layers of catalysts, separated by layers of tabular alumina balls, the length of each catalytic zone being:

| Zone— | Mm. |
|---|---|
| 1 | 400 |
| 2 | 310 |
| 3 | 490 |

External heating elements are arranged for controlling the temperatures of the three zones at 244, 271 and 340° C., respectively.

The reactor is charged with:

| | Moles/hour |
|---|---|
| Octachlorobutanone (99.5%) | 0.65 |
| Anhydrous hydrogen fluoride (99.7% pure) | 6.76 |

The excess of anhydrous HF in relation to the stoichiometry is 30%.

The absolute pressure in the reactor is set at 1.3 bars.

The contact times of the reagents in the three successive zones are 6 seconds, 3.9 seconds and 6.2 seconds, respectively.

At the outlet from the first zone the mixture of perchlorofluoro compounds contains an average of 2.9 fluorine atoms per organic molecule.

The reaction mixture contains 5.0 F atoms per molecule at the outlet from the second zone, which corresponds to an average ratio of number of fluorine atoms divided by number of chlorine atoms of 1.66.

At the outlet from the third zone, the organic portion of the effluent of the reactor presents the following composition:

| | Percent |
|---|---|
| Octafluoro butanone | 95.3 |
| Heptafluoromonochloro butanone | 1.2 |
| Various chlorofluoro hydrocarbons | 3.5 |

The overall fluorination rate in relation to HF expressed as the ratio of HF moles consumed to theoretic HF moles is 98.5%.

The content of the organic effluent in desired perfluoro product is 95.3%.

The rate of decomposition of the organic molecules by parasitic reactions reaches 3.5%.

The production of octafluoro butanone amounts to 0.62 moles per hour, that is 134 grams/hour. The productivity is equal to 159 grams per hour and per kilogram of catalyst.

Comparatively, by operating under the same conditions as above, but at a temperature of 340° C. throughout the reactor, the cracking rate reaches 27.8%, and the productivity drops to 120 grams of octafluoro butanone per hour and per kilogram of catalyst. The mixture obtained presents great separation difficulties.

By operating at 271° C. in the reactor, all other conditions being equal, the productivity in octafluoro butanone is zero; the effluent contains no perfluoro product. Moreover, the cracking rate rises to 7.1%.

EXAMPLE 4

The perfluorination of anhydrous trichloroacetaldehyde is carried out in the same equipment with the same catalyst as in Example 1 (1.2 liters; 0.84 kilograms) by arranging three layers of catalyst separated by layers of tabular alumina balls, the length of each catalytic zone being:

| Zone— | Mm. |
|---|---|
| 1 | 700 |
| 2 | 250 |
| 3 | 250 |

Outside heating elements are arranged to set the temperatures of the three zones at 240, 260 and 280° C., respectively.

The reactor is fed a mixture of anhydrous trichloro acetaldehyde (99.9% purity) and anhydrous HF (99.7% purity) with the following flow rates:

| | Moles/hour |
|---|---|
| Anhydrous trichloro acetaldehyde | 1.15 |
| Anhydrous HF | 6.0 |

The excess of anhydrous HF is 74% in relation to the stoichiometry. The absolute pressure in the reactor is set at 1.3 bars. The contact time of the reagents in the three successive zones are equal to 10.9 seconds for zone 1, 3.8 seconds for zone 2 and 3.6 seconds for zone 3.

In the reaction mixture at the outlet of zone 1, the average number of fluorine atoms fixed in an organic molecule reaches 2.2. In the reaction mixture at the outlet of the second zone, the average number of fluorine atoms reaches 2.6, and the mean value of ffuorine atoms to the number of chlorine atoms per organic molecule is equal to 6.25.

The composition of the organic portion of the effluent from the third catalytic zone is as follows:

| | Percent |
|---|---|
| Trifluoro acetaldehyde | 97.4 |
| Difluoromonochloro acetaldehyde | 1.9 |
| Fluoro $C_1$ compounds | 0.7 |

The total fluoroination rate in relation to HF is 98.9%.

The content of the desired perfluoro product in the organic effluent is 97.4%.

The rate of decomposition of the organic molecules by parasitic reactions is 0.7%.

The production of trifluoro acetaldehyde is 1.12 moles/hour or 110 grams/hours. The productivity is equal to 131 grams per hour and per kilogram of catalyst.

Comparatively, by operating at 280° C. throughout the reactor, the cracking of the organic molecules reaches 8.9%.

In another test, by operating at 260° C. in the reactor, the organic effluent contains 69.4% trifluoro acetaldehyde, the productivity drops to 93.9 grams per hour and per kilogram of catalyst, and the purification of the trifluoro acetaldehyde is extremely difficult.

The preceding examples make it easier to appreciate the advantages resulting from the method according to the invention.

The embodiment of the method is not limited to functional perchloro compounds mentioned in these examples. It is also obvious that in the present method the use of three reaction zones at temperatures increasing from the first to the third zone is a crucial condition to obtain excellent results, but it is possible to use more than three successive reaction zones without digressing from the scope of the invention.

The embodiment of zones with temperatures increasing in the catalytic bed can be obtained by any known means.

The catalytic bed may be continuous or separated into fractions contained in one single reactor or in successive reactors.

Various catalysts in the art of fluorination of organic molecules may be used in the instant process in the place of the one illustrated in the above examples. For instance, chromium oxide based catalysts optionally containing a minor proportion of oxides of iron, cobalt, aluminum, zirconium, manganese, bismuth, thorium and/or nickel; chrominum fluoride based catalysts containing optionally a minor porportion of fluorides of iron, cobalt, aluminum, zirconium, manganese, bismuth, thorium and/or nickel are all suitable catalysts.

The chromium oxide of the chromium based catalysts may be prepared, for example, by partial or total heat dehydration of a chromium hydroxide gel. Anhydrous chromium oxide may be obtained by calcination of inorganic chromium salts such as ammonium chromate, bichromate or chromium nitrate, or by calcination of organic chromium salts such as chromium oxalate or formate.

A specific catalyst also suitable for the instant process is described in copending application Ser. No. 249,672 filed concurrently herewith.

In addition, catalysts resulting from the HF treatment at temperatures between 150–600° C., preferably 220–400° C., of the above mentioned chromium oxide based catalysts are appropriate for use as catalysts in achieving the objects of the instant process.

It will be understood that various changes and modifications can be made in the details of formulation, procedure and use without departing from the spirit of the invention, especially as defined in the following claims.

We claim:

1. In a method for the perfluorination of an acylic perchloro compound containing a functional group selected from the group consisting of an ether-oxide group, an aldehyde group, a ketone group, an acid chloride group and a nitrile group, and containing at least one of the groups —$CCl_3$ and —$C_2Cl_5$ wherein the perchloro compound and anhydrous HF in the vapor phase are contacted with a chromium-based fluorination catalyst, the improvement comprising passing the perchloro compound and HF through a first reaction zone containing a fixed bed of the catalyst at a temperature within the range of 220 to 250° C. to convert the perchloro compound to at least the corresponding difluoro derivative, passing the reaction gases to a second zone containing a fixed bed of the catalyst at a temperature within the range of 250° to 275° C. to produce a reaction mixture of intermediate chlorofluoro organic molecules in which the average ratio of F atoms to the number of chlorine atoms present in the organic molecules is at least 1.5, passing the reaction mixture from the second zone to a third reaction zone containing a fixed bed of the catalyst at a temperature within the range of 275° to 350° C., and separating the perfluoro compound produced, with the pressure in each of the zones being within the range of 1 to 4 bars and with the temperature of each of the zones being at least 10° higher than that of the preceding zone.

2. A method as defined in claim 1 wherein the pressure in each of the zones is within the range of 1.2 to 2.5 bars.

3. A method as defined in claim 1 wherein the contact time in each of the zones is within the range of 2 to 10 seconds.

4. A method as defined in claim 1 wherein the HF is used in an amount 20 to 80 mole percent in excess of the stoichiometric amount.

5. A method as defined in claim 1 wherein the perchloro compound is hexachloroacetone.

6. A method as defined in claim 5 wherein the intermediate perchlorofluoro compounds in the effluent from the second reaction zone contain, on the average, a ratio of the number of fluorine atoms to the number of chlorine atoms equal to or higher than 2.

7. A method as defined in claim 1 wherein the perchloro compound is trichloroacetyl chloride.

8. A method as defined in claim 7 wherein the intermediate perchlorofluoro compounds in the effluent from the second reaction zone contains, on the average, a ratio of the number of fluorine atoms to the number of chlorine atoms equal to or higher than 3.

9. A method as defined in claim 1 wherein the perchloro compound is trichloroacetaldehyde.

10. A method as defined in claim 9 wherein the intermediate perchlorofluoro compounds in the effluent from the second reaction zone contain, on the average, a ratio of the number of fluorine atoms to the number of chlorine atoms equal to or higher than 3.

11. A method as defined in claim 1 wherein said perchloro compound is selected from the group consisting of trichloroacetyl chloride, hexachloroacetone, octachlorobutanone, trichloroacetaldehyde and pentachloropropionyl chloride.

References Cited
UNITED STATES PATENTS 3,385,794    5/1968    Scherer et al. _____ 260—544 F LORRAINE A. WEINBERGER, Primary Examiner R. D. KELLY, Assistant Examiner U.S. Cl. X.R.

260—465.7, 593 H; 601 H, 614 F